(12) United States Patent
Khawer et al.

(10) Patent No.: US 12,250,549 B2
(45) Date of Patent: Mar. 11, 2025

(54) HIGH AVAILABILITY ACCESS TO SHARED SPECTRUM USING GEO-REDUNDANT SPECTRUM ACCESS SYSTEMS

(71) Applicant: Nokia Solutions and Networks Oy, Espoo (FI)

(72) Inventors: Mohammad Riaz Khawer, Lake Hopatcong, NJ (US); Milind M. Buddhikot, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 980 days.

(21) Appl. No.: 17/264,633

(22) PCT Filed: Jul. 31, 2018

(86) PCT No.: PCT/US2018/044642
§ 371 (c)(1),
(2) Date: Jan. 29, 2021

(87) PCT Pub. No.: WO2020/027808
PCT Pub. Date: Feb. 6, 2020

(65) Prior Publication Data
US 2021/0211880 A1    Jul. 8, 2021

(51) Int. Cl.
*G06F 21/00* (2013.01)
*G06F 16/27* (2019.01)
(Continued)

(52) U.S. Cl.
CPC .......... *H04W 12/121* (2021.01); *G06F 16/27* (2019.01); *H04W 12/08* (2013.01); *H04W 16/14* (2013.01); *H04W 60/06* (2013.01); *H04W 76/10* (2018.02)

(58) Field of Classification Search
CPC ..... G06F 16/27; H04W 12/08; H04W 12/121; H04W 76/10
See application file for complete search history.

(56) References Cited

U.S. PATENT DOCUMENTS

2018/0132111 A1*  5/2018  Mueck ................ H04B 1/7136

OTHER PUBLICATIONS

Prakash Moorut, Spectrum Sharing Commitee Work Group 3 (WG3) Protocol Webinar, Jun. 16, 2016, Slides 2-70 (Year: 2016).*
(Continued)

*Primary Examiner* — Rodman Alexander Mahmoudi
(74) *Attorney, Agent, or Firm* — Tong, Rea, Bentley & Kim, LLC

(57) ABSTRACT

A first spectrum access system (SAS) instance receives a message (such as a heartbeat message) including an identifier of a first base station that is not registered with the first SAS instance. The first SAS instance accesses a database that is shared with a second SAS instance and periodically synchronized with the second SAS instance. The first SAS instance provides an SAS service that was previously established between the first base station and the second SAS instance in response to the database including a record generated by the second SAS instance for the first base station. The first base station registers to provide connectivity in a shared spectrum using the SAS service provided by the second SAS instance. The first base station transmits the message to the first SAS instance including an identifier of the first base station in response to the second SAS instance becoming unavailable.

20 Claims, 14 Drawing Sheets

(51) Int. Cl.
| | |
|---|---|
| *H04W 12/08* | (2021.01) |
| *H04W 12/121* | (2021.01) |
| *H04W 16/14* | (2009.01) |
| *H04W 60/06* | (2009.01) |
| *H04W 76/10* | (2018.01) |

(56) References Cited

OTHER PUBLICATIONS

Marko Palola, Field Trial of the 3.5 GHz Citizens Broadband Radio Service Governed by a Spectrum Access System (SAS), 2017 (Year: 2017).*

International Search Report and Written Opinion mailed in corresponding PCT Application No. PCT/US2018/044642, mailed on Mar. 13, 2019, 14 pages.

Moorut, P., et al., "Spectrum Sharing Committee Work Group 3 (WG3) Protocol Webinar Presenters," Wireless Innovation Forum, Jun. 16, 2016, 70 pages.

Palola, M., et al., "Field Trial of the 3.5 GHz Citizens Broadband Radio Service Governed by a Spectrum Access System (SAS)," IEEE International Symposium on Dynamic Spectrum Access Networks (DYSPAN), Mar. 6, 2017, 9 pages.

Kim, C.W., et al., "Design and Implementation of an End-to-End Architecture for 3.5 GHz Shared Spectrum," IEEE International Symposium on Dynamic Spectrum Access Networks (DYSPAN), Sep. 29, 2015, 12 pages.

* cited by examiner

HIGH AVAILABILITY ACCESS TO SHARED SPECTRUM USING GEO-REDUNDANT SPECTRUM ACCESS SYSTEMS

BACKGROUND

Spectrum is the most precious commodity in deploying wireless networks such as a private enterprise network. Cellular communication systems, such as networks that provide wireless connectivity using Long Term Evolution (LTE) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication system such as LTE networks. The 3.1-4.2 GHz spectrum is occupied by incumbents such as Fixed Satellite System (FSS) and federal incumbents such as U.S. government or military entities. For example, the 3550-3700 MHz frequency band (CBRS band) was previously reserved for exclusive use by incumbents including the United States Navy and Fixed Satellite Service (FSS) earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more Citizens Band Service Devices (CBSDs) consistent with 47 CFR § 96.33, et seq. Incumbents, PAL licensees, and GAA operators are required to request access from a spectrum access system (SAS), which allocates frequency bands to the operators, e.g., for CBRS within the 3550-3700 MHz band. The frequency bands are allocated to the CBSDs associated with the operators within particular geographical areas and, in some cases, during particular time intervals. The SAS determines whether incumbents are present within corresponding geographical areas using an environmental sensing capability (ESC) that performs incumbent detection, e.g., using radar to detect the presence of a Navy ship in a port. Each SAS is able to serve multiple private enterprise networks that include a large number of CBSDs such as base stations, eNodeBs, microcells, picocells, and the like.

The tiered access architecture provides priority access to incumbents, which include Grandfathered Wireless Broadband Licensees that are authorized to operate on a primary basis on frequencies designated in 47 CFR § 96.11. When an incumbent is present in a particular geographical area, the incumbent is granted exclusive access to a portion of the CBRS spectrum. For example, if a Navy ship enters a port, communication systems on the ship are granted exclusive access to a 20-40 MHz band within the 3550-3700 MHz band. Operators that have received a PAL and GAA operators are required to vacate the band allocated to the ship. A PAL license grants exclusive access to a portion of the 3550-3700 MHz band within a predetermined geographical area as long as no incumbents have been allocated an overlapping portion of the 3550-3700 MHz band within the predetermined geographical area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

Each CBSD that provides wireless connectivity in the CBRS spectrum must be under direct control of an SAS. The CBSDs therefore register with an SAS to begin providing wireless connectivity. The status of the CBSDs is monitored using heartbeat messages exchanged between a registered CBSD and its controlling SAS. The heartbeat messages are exchanged at predetermined time intervals (e.g., 20 seconds, 30 seconds, 60 seconds, and the like) and registration of the CBSD with the SAS is maintained as long as at least one heartbeat message is successfully received within a timeout interval such as 240 seconds or 300 seconds. A break in the heartbeat messages for more than the timeout interval causes the CBSD to stop their transmissions on the channel granted by the SAS in the CBRS band and thus incur a service downtime that is not acceptable for commercial deployment. Thus, a private enterprise network can be disrupted or shut down if the SAS is unavailable for any reason that prevents the CBSDs and the SAS from exchanging heartbeat messages including a natural disaster that impacts a regional data center that hosts the SAS, a distributed denial of service (DDOS) attack, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
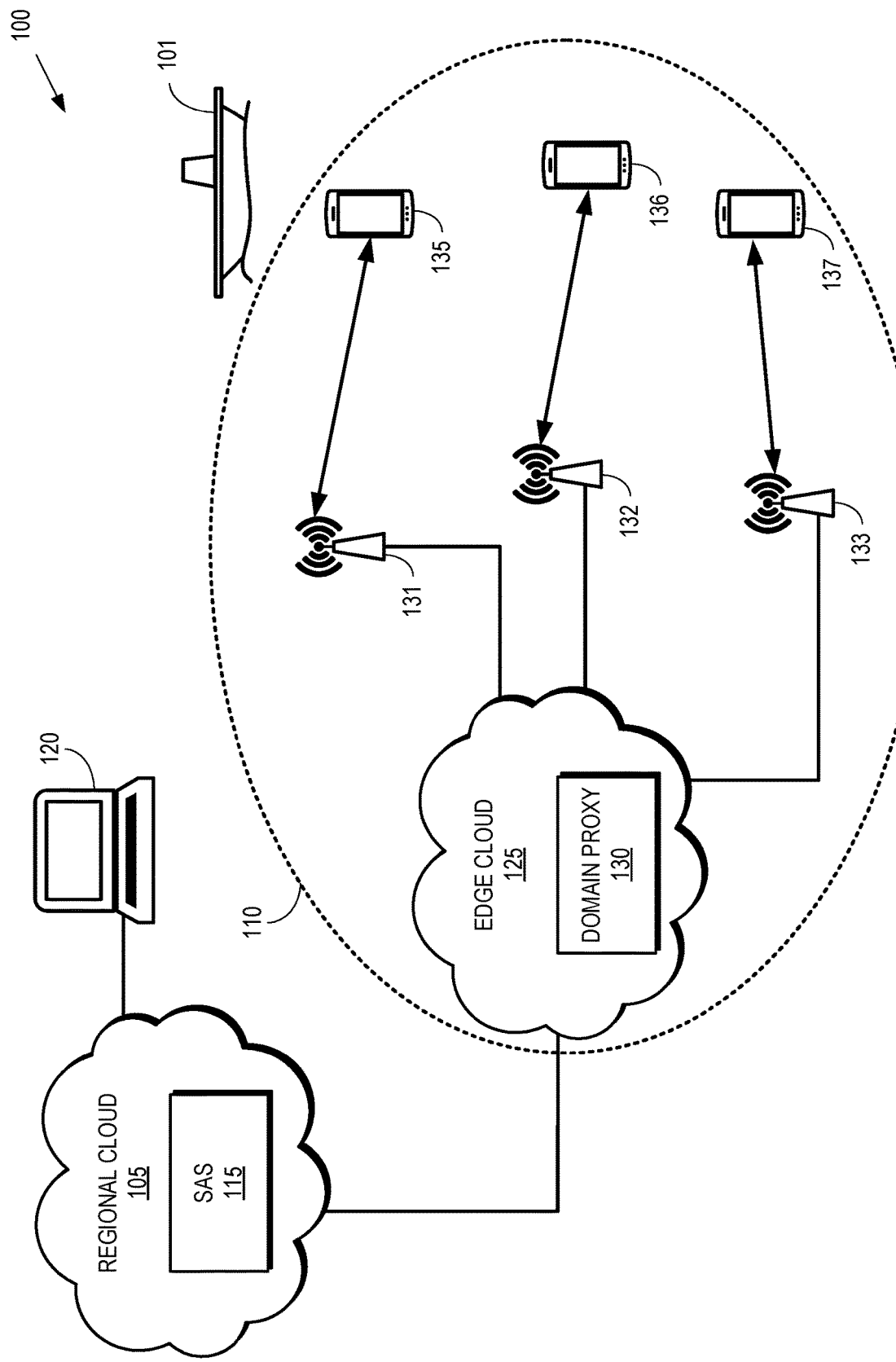
FIG. 1 is a block diagram of a communication system according to some embodiments.

One approach to providing high-availability is to implement geo-redundancy, e.g., by associating each CBSD with a primary SAS in one location and a secondary SAS in another location. If the primary SAS goes down, the CBSDs connect to the secondary SAS and resume CBRS band operation. However, switching between the primary SAS and the secondary SAS requires that the CBSD stop its current CBRS band operation on the channel granted by the primary SAS to comply with CBRS band rules established by the FCC. The CBRS then transmits a registration request to the secondary SAS to acquire a new channel in the shared spectrum for providing wireless connectivity. The secondary SAS allocates the channel to the CBSD by transmitting a grant message. Laboratory performance testing has shown that switching between geo-redundant SASs causes a service down time of several minutes for the CBSD. A service downtime of this duration is not acceptable to many customers such as industrial automation customers that do not have access to any licensed spectrum besides the CBRS shared spectrum. Consequently, geo-redundant SAS instances alone do not solve the problem of service interruption for the CBRS band network and require additional architectural solutions to avoid any potential service downtime that may result from switching between geo redundant SAS instances.

The operational SAS instances provided by SAS vendors advertise the ports and Internet protocol (IP) addresses that are used to provide SAS services. The CBSDs use the advertised information to identify appropriate SAS instances to act as the primary SAS and the secondary SAS. The SAS instances are interconnected with all other advertised SAS instances from all SAS vendors in a mesh configuration. The interconnected SAS instances periodically (e.g., hourly, daily, or weekly) exchange (or "dump") information for the registered CBSDs to ensure that the SAS instances for different SAS vendors are aware of other CBSDs managed by different SAS. In some cases, the different SAS are in the same geographic area and the SAS instances use the information dump to perform interference calculations that are used when allocating channels of the CBRS band to the CBSDs. The SAS instances store CBSD records including state information, channel grants, and the like in a database. A geo-redundant SAS instance in a regional data center may use a database schema that is not synchronized with another geo-redundant SAS instance in a different regional data center. The CBSDs are registered with the primary geo-redundant SAS instance and only switch over to the secondary SAS instance in response to connectivity issues with the primary SAS instance. The secondary SAS instance may not have stored CBSD state information from the primary SAS instance, in which case the CBSD is required to re-register with the secondary SAS instance. The re-registration process contributes to the delay in CBRS network service downtime.

Conventional message exchange between the SAS instances does not relay SAS-CBSD state machine related information between the SAS instances at least in part because it is each SAS vendor implementation specific. The lack of database synchronization for the SAS-CBSD state machine across the SAS instances hosted on different regional data centers results in a loss of coherence between the databases used by the primary SAS and the secondary SAS for the CBSD. In the event of a failure of a primary SAS, the lack of coherence may result in a CBSD having to first stop operation in the CBRS band on the channel granted by the primary SAS, and then re-register with its secondary SAS if the database used by the secondary SAS does not include an up-to-date record for the CBSD. Laboratory testing has shown that the process of termination of the CBRS band operation followed by re-registration, and then resumption of transmission on a new granted channel by the secondary SAS takes approximately 5-6 minutes to complete, which is a significant disruption to the operation of any CBRS network.

FIGS. 1-14 disclose techniques for providing high-SAS availability in a Citizens Broadband Radio Service (CBRS) system using geo-redundant spectrum access systems (SASs) to implement a primary SAS and a secondary SAS for a Citizens Band Service Device (CBSD) in the CBRS system. The CBSD is referred to herein as a base station. In response to the primary SAS becoming unavailable, the base station switches to the secondary SAS to receive the CBRS service. The primary and secondary SAS instances share an SAS database that stores records that are indexed by identifiers of the base stations that are registered with the primary SAS or the secondary SAS. The current states and channel allocation information for the base stations are stored in corresponding records of the SAS database. Some embodiments of the SAS database are implemented as a first database associated with the primary SAS and a second database associated with the secondary SAS. The shared SAS database is periodically synchronized to update the records with state and channel allocation information from the primary SAS and secondary SAS. After synchronization, the shared database includes records that indicate the base stations that are currently registered with the primary SAS or the secondary SAS. Thus, in response to a base station switching from the primary SAS to the secondary SAS, the secondary SAS can access the current state and channel allocation for the base station based on a record in the shared SAS database that is indexed by an identifier of the base station. If the secondary SAS does not identify a record based on the identifier, some embodiments of the secondary SAS trigger synchronization of the shared database and then repeat the attempt to identify the record. If the repeated attempt is successful, the base station is not required to stop its current CBRS band operation and re-register with the secondary SAS, which continues to provide the SAS service based on the information stored in the record.

As discussed herein, a base station registers with a primary SAS to provide an SAS service and begins exchanging heartbeat messages with the primary SAS. The base station must cease CBRS band operation on the channel granted by the primary SAS in response to losing the heartbeat messages for more than a timeout interval such as 240 seconds, 300 seconds, and the like. The base station switches to the secondary SAS in response to losing the heartbeat messages with the primary base station. Some embodiments of the base station begin transmitting heartbeat messages to the secondary SAS in response to losing the heartbeat messages with the primary SAS for a time interval that is less than the timeout interval. For example, if the timeout interval is 240 seconds, a base station can begin transmitting heartbeat messages to a secondary SAS in response to losing the heartbeat messages with the primary SAS for 180 seconds. In that case, the secondary SAS has 60 seconds to locate a record in the shared SAS database indexed by the identifier included in the heartbeat message before the base station is required to de-activate its operation in the CBRS band using the channel granted by the primary SAS. The secondary SAS continues to provide service to the base station, without requiring deactivation, in response to the secondary SAS locating the record in the shared SAS database.

In some cases, the secondary SAS is unable to find the record in the database because the database has not been synchronized recently and the SAS-CBSD record information has not have been updated in the database associated by the secondary SAS. The secondary SAS triggers another database synchronization between the primary and secondary SAS. The secondary SAS does not force the CBSD to de-activate and re-register during the synchronization process and allows it to continue its normal CBRS band operation on the channel granted to it by the other SAS instance. If the database synchronization is successful, and the secondary SAS finds the CBSD record, the CBSD operation will continue. However, if the database synchronization fails to retrieve the SAS-DB record in time (e.g. the remaining 60 seconds) the secondary SAS forces the CBSD to go through a re-registration process incurring service downtime. The latter may occur because the primary SAS data center may have been truly down due to any reason including natural disaster.

Collocated base stations further enhance the availability of the CBRS network by providing overlapping coverage within a coverage area on different channels of the CBRS spectrum. The collocated base stations register with geo-redundant SASs. One of the collocated base stations uses a first SAS as its primary and a second SAS as it secondary, while the other one of the collocated base stations uses the second SAS as its primary and the first SAS as it secondary. Thus, one of the collocated base stations is available to provide coverage within the coverage area if either the first or second SAS becomes unavailable. User equipment within the coverage area hand off to the collocated base station that remains connected to the available primary SAS while the other collocated base station switches to its secondary SAS, e.g., as described above.

Geo-redundant SAS are still vulnerable to malicious attacks such as DDOS attacks because the SAS administrator advertise the ports and IP addresses to make them visible to legitimate base stations, which also makes them visible to malicious attackers. Providers of SAS services therefore implement a non-advertised backup SAS instance that is only connected (and therefore only synchronized with) advertised SAS instances owned or operated by the SAS provider. Thus, the non-advertised backup SAS instance is not visible to potential malicious attackers. The non-advertised backup SAS instance is hosted on an edge cloud of a private enterprise network, or in a non-advertised geo-redundant data center, or other location. Information identifying the non-advertised backup SAS instance is provided to the private enterprise network, e.g., during installation or configuration, so that the private enterprise network is able to switch to the non-advertised backup SAS instance in the event of an attack. Some embodiments of the private enterprise network monitor message latencies to identify the onset of an attack. For example, a domain proxy on the edge cloud router can monitor message latencies to detect the onset of a DDOS attack.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. In that case, the other devices are required to vacate any portion of the frequency band that overlaps with another portion of the frequency band that is allocated to the incumbent device. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110. The regional cloud 105 also includes an SAS 115 to allocate frequency bands to operators, e.g., to the private enterprise network 110 for CBRS within the 3550-3700 MHz band. Operation of the SAS 115 is disclosed in more detail below. A single SAS 115 is shown in FIG. 1 in the interest of clarity. If multiple SAS are present in the communication system 100, the SAS are able to communicate with each other over corresponding SAS-SAS interfaces. The SAS 115 is able to serve multiple private enterprise networks, although a single private enterprise network 110 is shown in FIG. 1 in the interest of clarity.

The regional cloud 105 is configured via user interface portals to one or more external computers 120, only one shown in FIG. 1 in the interest of clarity. For example, the external computer 120 can provide a customer user interface portal for service management, a digital automation cloud management user interface portal, and an SAS user interface portal that is used to configure the SAS 115.

The private enterprise network 110 includes an edge cloud 125 that communicates with the regional cloud 105 to support a plug-and-play deployment of the private enterprise network 110. Some embodiments of the edge cloud 125 support auto configuration and self-service, industrial protocols, local connectivity with low latency, LTE-based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, and the like. As used herein, the term "base station" refers to any device that provides wireless connectivity and operates as a CBSD in the private enterprise network 110 as either category A CBSD (Indoor), or Category B CBSD (outdoor). The CBSDs 131, 132, 133 are therefore referred to herein as the base stations 131, 132, 133 and collectively as "the base stations 131-133." Some embodiments of the domain proxy 130 are implemented in the regional cloud 105.

The domain proxy 130 mediates between the SAS 115 and the base stations 131-133. In order to utilize the shared spectrum, the base stations 131-133 transmit requests towards the SAS 115 to request allocation of a portion of a frequency band. The requests include information identifying the portion of the frequency band, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SAS 115 by aggregating requests from multiple base stations 131-133 into a smaller number of messages that are transmitted from the domain proxy 130 to the SAS 115. The base stations 131-133 provide wireless connectivity to corresponding user equipment 135, 136, 137 (collectively referred to herein as "the user equipment 135-137") in response to the SAS 115 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mall or shopping center and the base stations 131-133 are used to provide wireless connectivity within different stores that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from the corresponding base station 131-133. The domain proxy 130 determines whether the base station 131-133 is permitted to access the SAS 115 based on the policy, e.g., by comparing information in the policy to information in one or more mandatory fields of the request. The domain proxy 130 selectively provides the requests to the SAS 115 depending on whether the base station 131-133 is permitted to access the SAS 115. If so, the request is transmitted to the SAS 115 or aggregated with other requests for transmission to the SAS 115. Otherwise, the request is rejected.

Figure 2:
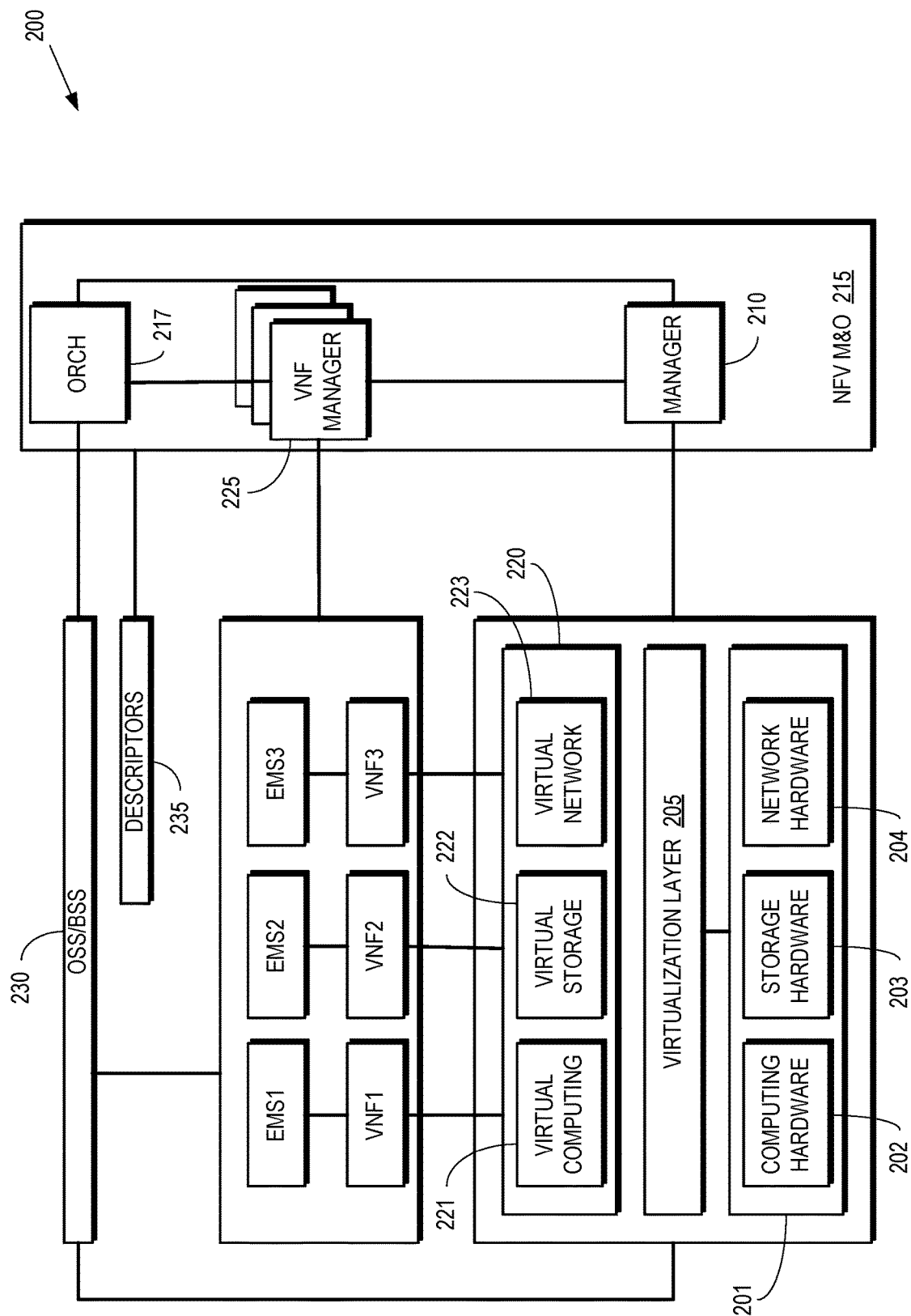
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing 221, virtual storage 222, and virtual networking 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. For example, the descriptors 235 can be used to store descriptions of a virtual network function implementation of the agent 175 shown in FIG. 1. Information in the descriptors 235 may be updated or modified by the NFV M&O 215.

The NFV architecture 200 can be used to implement network slices that provide user plane or control plane functions. A network slice is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
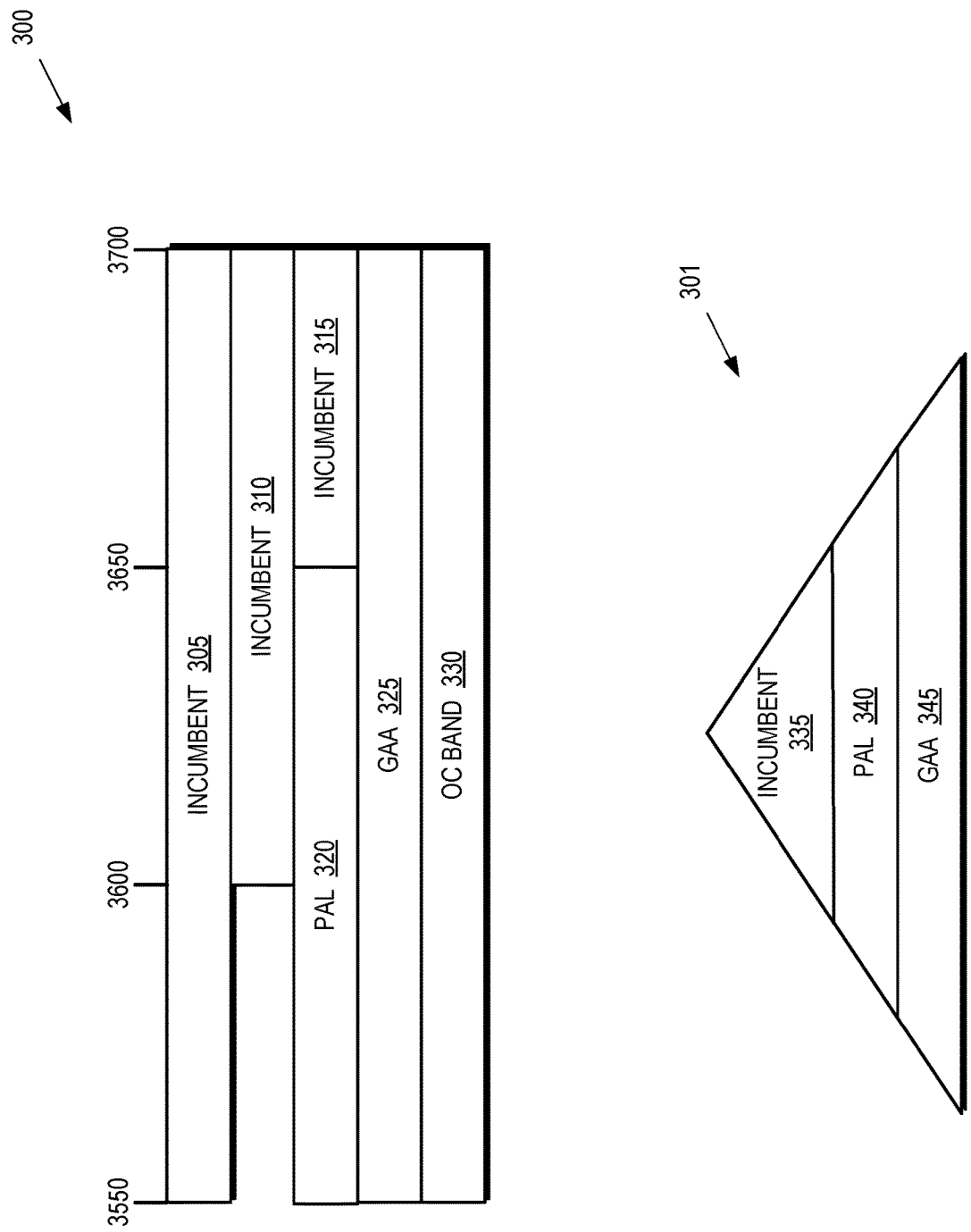
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as the SAS 115 shown in FIG. 1 allocates portions of the frequency band to devices for providing wireless connectivity within a geographic area. For example, the SAS can allocate 20-40 MHz portions of the frequency band to different devices.

Portions of the frequency band are allocated to incumbent federal radio location devices, such as Navy ships, from the block 305, which corresponds to all of the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the entire 150 MHz of CBRS band as long as it is not pre-empted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area.

Figure 4:
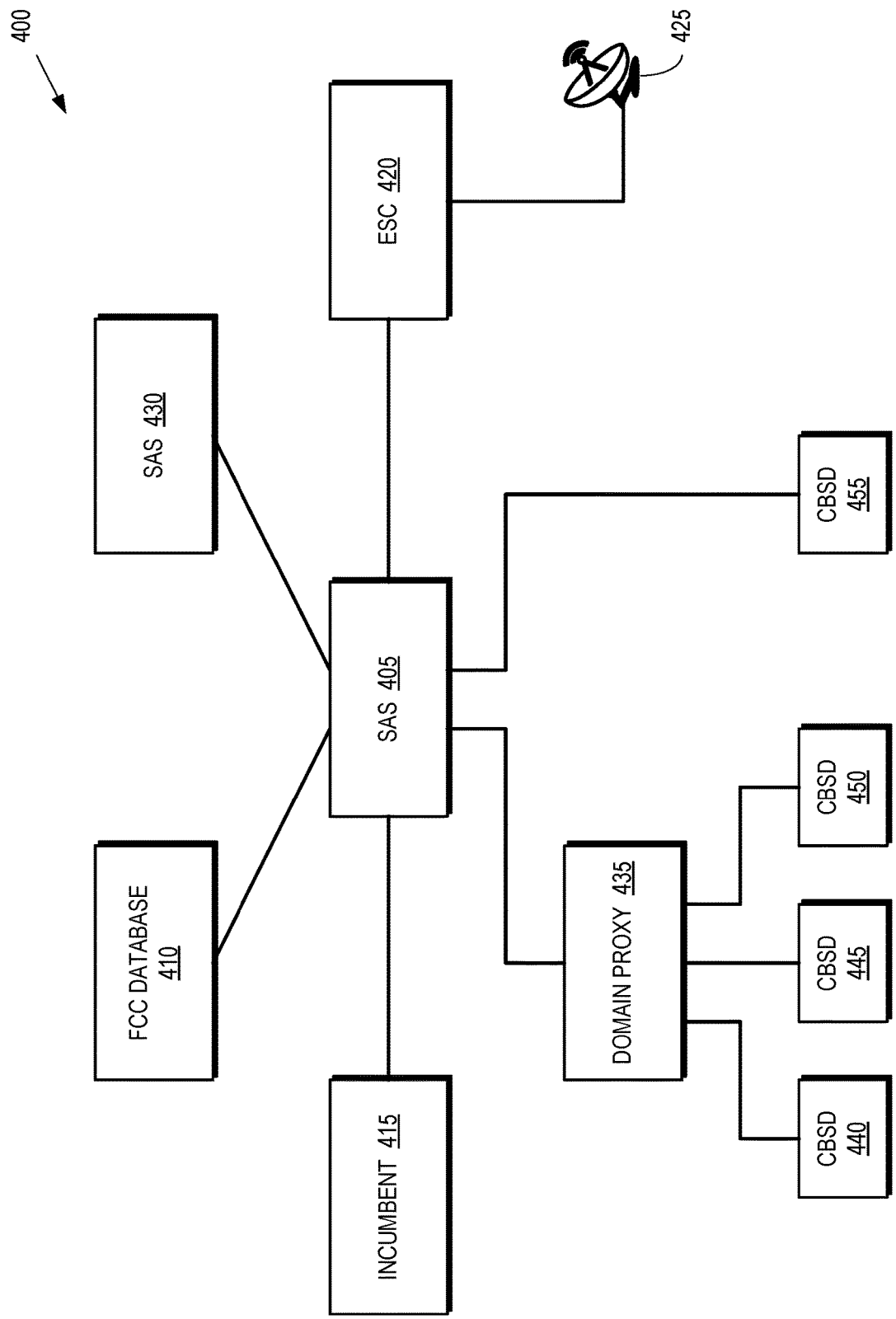
FIG. 4 is a block diagram of a communication system that implements tiered spectrum access according to some embodiments.

FIG. 4 is a block diagram of a communication system 400 that implements tiered spectrum access according to some embodiments. In the illustrated embodiment, the communication system 400 implements tiered spectrum access in the 3550-3700 CBRS band via a WInnForum architecture. The communication system 400 includes an SAS 405 that performs operations including incumbent interference determination and channel assignment, e.g., for CBRS channels shown in FIG. 3. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS 405. The SAS 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS 405 are connected to other SAS 430 via corresponding interfaces so that the SAS 405, 430 are able to coordinate allocation of portions of the frequency range in geographic areas or time intervals.

A domain proxy 435 mediates communication between the SAS 405 and one or more CBSD 440, 445, 450 via corresponding interfaces. The domain proxy 435 receives channel access requests from the CBSDs 440, 445, 450 and verifies that the CBSDs 440, 445, 450 are permitted to request channel allocations from the SAS 405. The domain proxy 435 forwards requests from the permitted CBSDs 440, 445, 450 to the SAS 405. In some embodiments, the domain proxy 435 aggregates the requests from the permitted CBSDs 440, 445, 450 before providing the aggregated request to the SAS 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS 405, the domain proxy 435 operates as a single entity that hides or abstracts presence of the multiple CBSDs 440, 445, 450 and conveys communications between the SAS 405 and the CBSDs 440, 445, 450. One or more CBSD 455 (only one shown in the interest of clarity) are connected directly to the SAS 405 and can therefore transmit channel access requests directly to the SAS 405. Additional discussion of this architecture is provided in Appendix B, from the Wireless Innovation Forum, entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
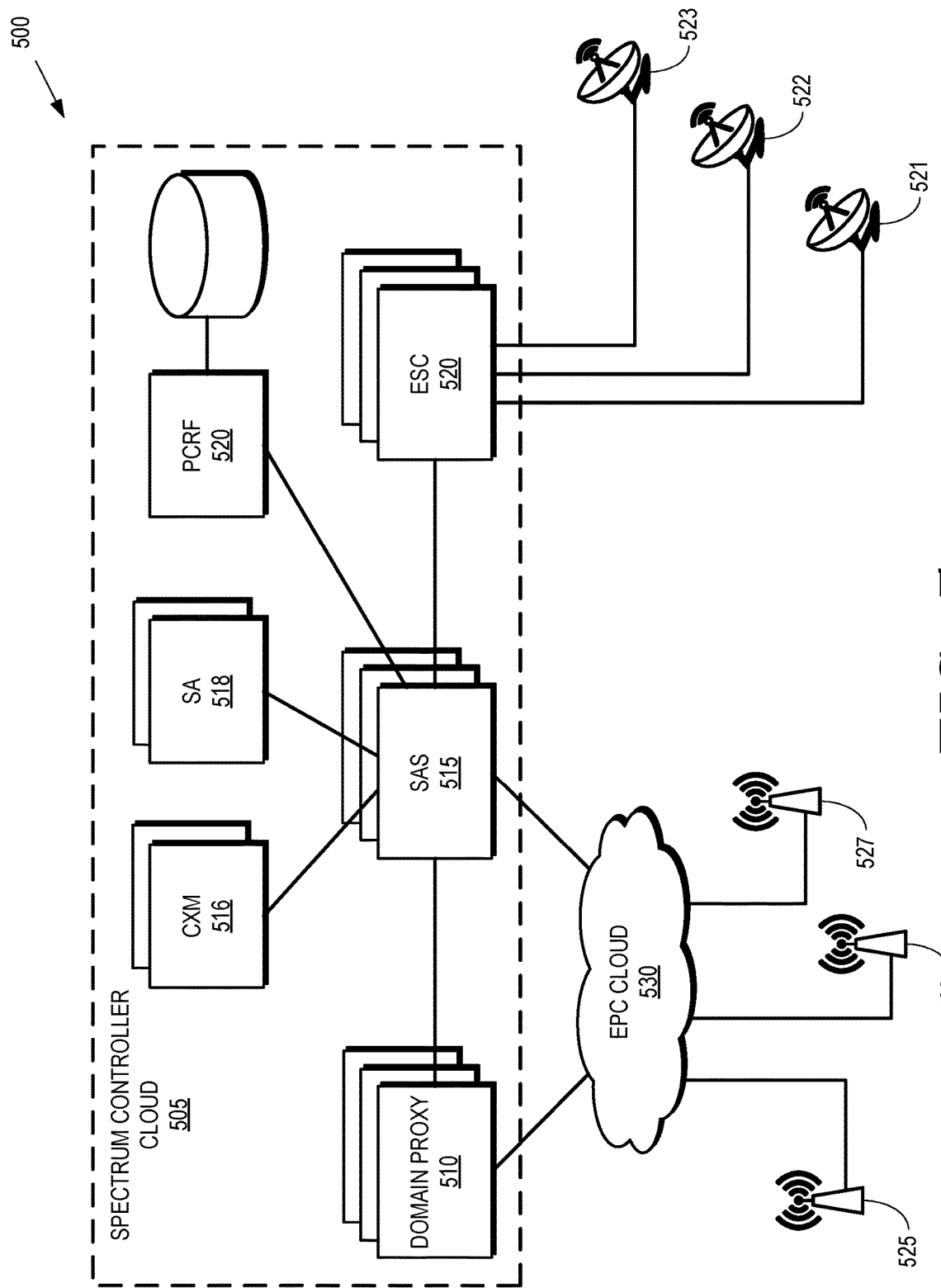
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum controller cloud 505 instantiates multiple instances of domain proxies 510 that support one or more private enterprise networks. The spectrum controller cloud 505 also instantiates multiple SAS instances 515 that support one or more private enterprise networks. Although not shown in FIG. 5, the SAS instances 515 can be connected to other SAS instances, e.g., in other clouds, via corresponding interfaces. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship. The ESC instances 520 notify the corresponding instance of the SAS 515 in response to detecting the presence of an incumbent in a corresponding geographic area. The SAS 515 is then able to instruct non-incumbent devices that serve the geographic area to vacate portions of the spectrum overlapping with the spectrum allocated to the incumbent, e.g., by defining a DPA.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 525 operates according to a PAL and GAA in the 3.5 GHz frequency band. The base stations 525-527 are configured as Category A (indoor operation with a maximum power of 30 dBm) and Category B (outdoor operation with a maximum power of 47 dBm). However, in other embodiments, one or more of the base stations 525-527 are configured as either Category A or Category B. The EPC cloud 530 provides functionality including LTE EPC operation support system (OSS) functionality, analytics such as traffic analytics used to determine latencies, and the like.

The spectrum controller cloud 505 also includes a policy control and rules function (PCRF) 535 that creates policy rules and makes policy decisions for network subscribers in real-time. The PCRF 535 supports service data flow detection, policy enforcement, and flow-based charging. Policies created or accessed by the PCRF 535 for network subscribers are stored in a corresponding database 540 in records associated with the different subscribers.

Figure 6:
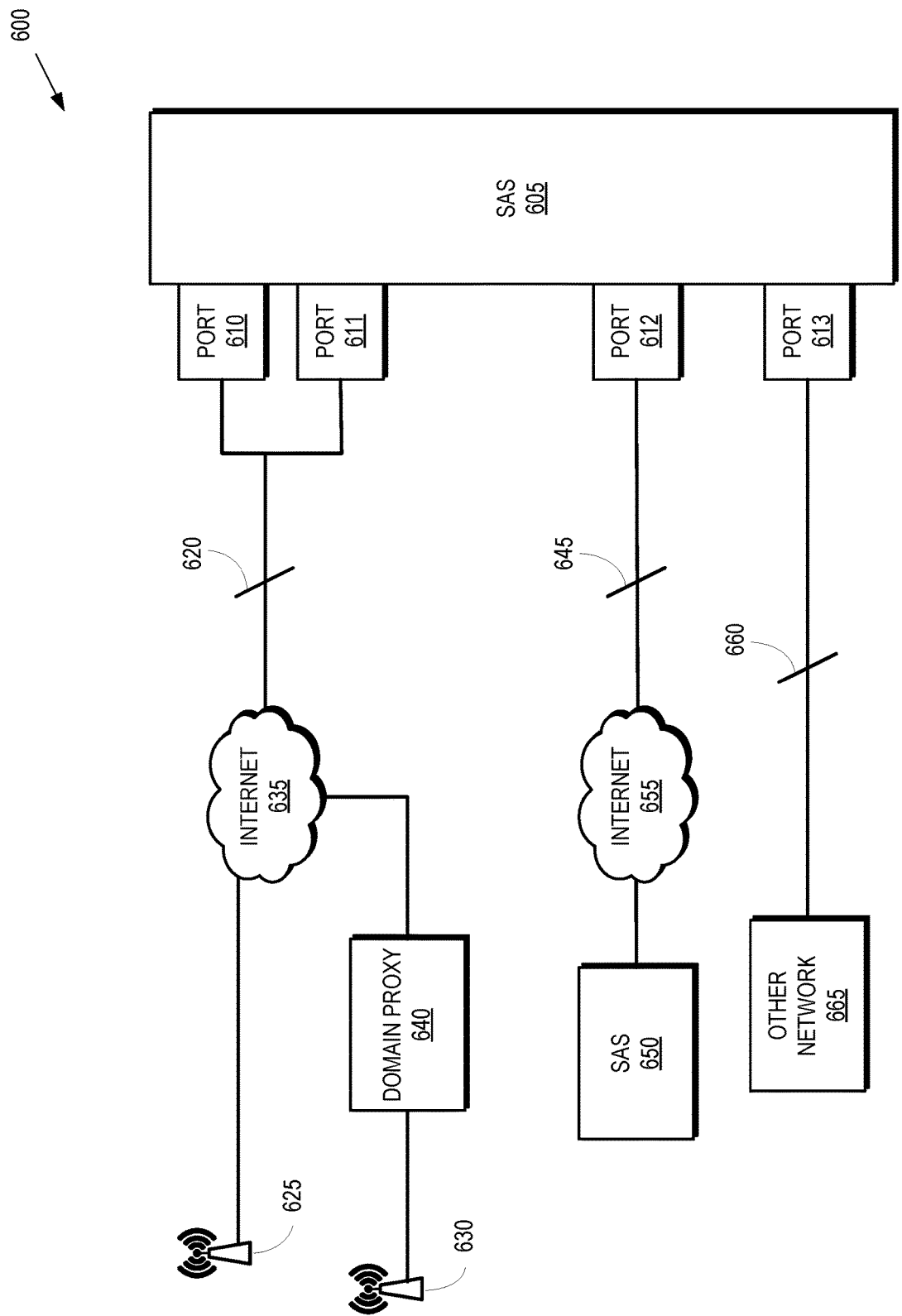
FIG. 6 is a block diagram of communication system including interfaces between CBSDs and an SAS according to some embodiments.

FIG. 6 is a block diagram of communication system 600 including interfaces between CBSDs and an SAS 605 according to some embodiments. The SAS 605 is used to implement some embodiments of the SAS 115 shown in FIG. 1, the SAS 405, 430 shown in FIG. 4, and the instances of the SAS 515 shown in FIG. 5. The SAS 605 includes ports 610, 611, 612, 613 (collectively referred to herein as "the ports 610-613") that provide access to the SAS 605.

An interface 620 supports communication between the SAS 605 and CBSDs 625, 630 via a network such as the Internet 635 and the ports 610, 611. The CBSD 625 is connected directly to the SAS 605 via the interface 620. The CBSD 630 is connected to the SAS 605 via a domain proxy 640 that is connected to the SAS 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS 605 and one or more other SAS 650 (only one shown in FIG. 6 in the interest of clarity) via a network such as the Internet 655 and the port 612. The SAS 650 can be owned and operated by other providers. An interface 660 supports communication between the SAS 605 and one or more other networks 665 (only one shown in FIG. 6 in the interest of clarity) via the port 613.

Some embodiments of the SAS 605 advertise identifiers of the ports 610-613, e.g., by broadcasting the identifiers via networks including the Internet 635 and the Internet 655. The CBSDs 625, 630 receive the advertised identifiers and use them to access one or more of the ports 610-613 for SAS services. Some embodiments of the SAS 605 also advertise an Internet protocol (IP) address for the SAS 605, which the CBSDs 625, 630 use to access the SAS 605 for SAS services. However, as discussed herein, the advertised identifiers and IP addresses are also visible to malicious attackers and can therefore be used to launch DDos attacks. Some embodiments of the SAS 605 are therefore configured to remain unadvertised and do not broadcast either identifiers of the ports 610-613 or IP addresses associated with the SAS 605. The port identifiers and IP addresses are provisioned to CBSDs 625, 630 without advertising them, e.g., by provisioning the port identifiers or IP addresses during installation or configuration of the CBSDs 625, 630.

Figure 7:
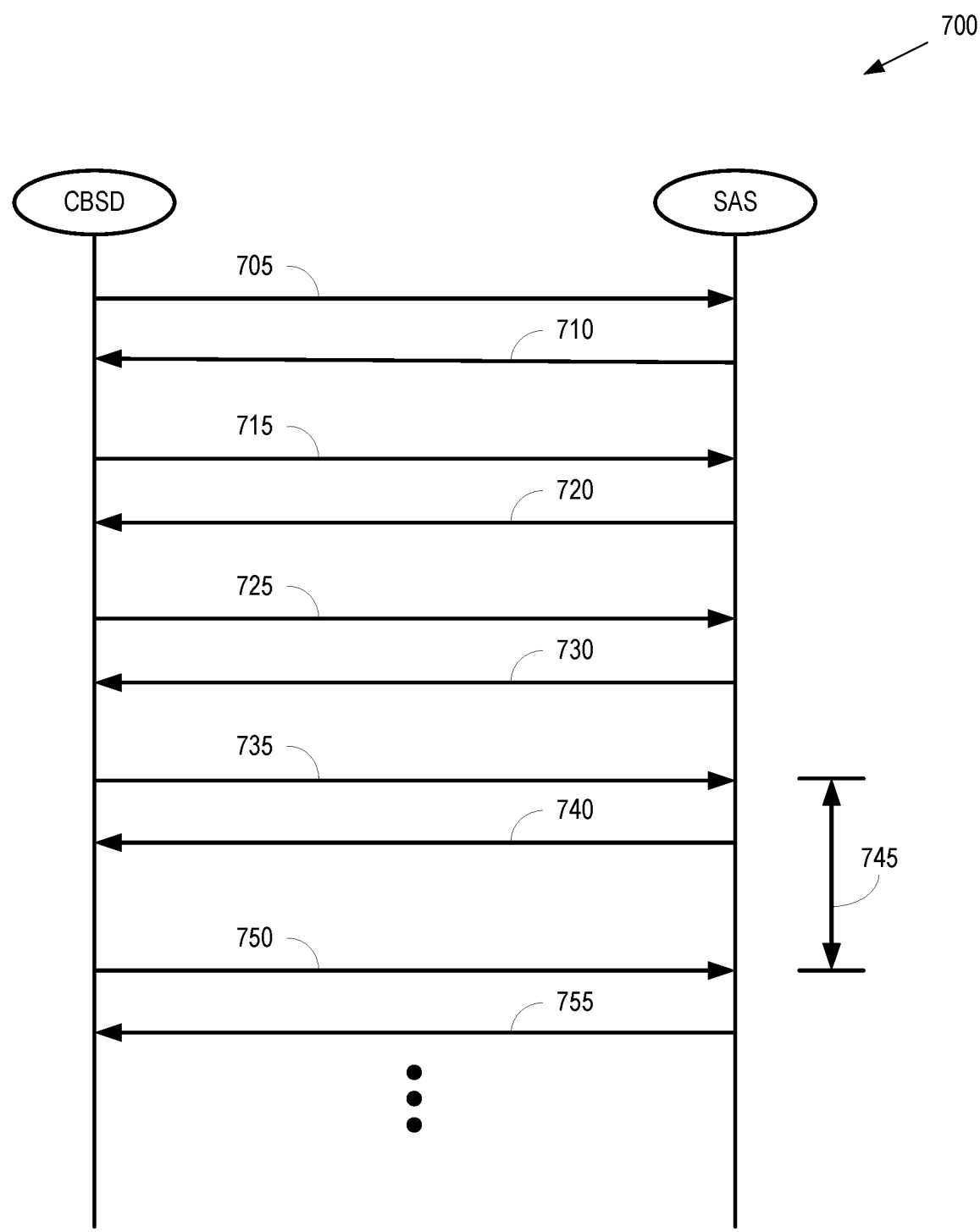
FIG. 7 is a message flow that illustrates messages exchanged between a CBSD and an SAS according to some embodiments.

FIG. 7 is a message flow 700 that illustrates messages exchanged between a CBSD and an SAS according to some embodiments. The message flow 700 is implemented in some embodiments of the communication system 100 shown in FIG. 1, the communication system 400 shown in FIG. 4, the communication system 500 shown in FIG. 5, and the communication system 600 shown in FIG. 6.

The CBSD initiates a registration procedure to register the CBSD for SAS services by transmitting a registration request 705 to the SAS. The registration request 705 includes information indicating a type of the CBSD such as Category A, Category B, or CPE. The SAS responds to the registration request 705 by transmitting a registration response 710 that indicates whether the SAS accepts or rejects the request.

Some embodiments of the CBSD transmit a spectrum inquiry 715 to the SAS. The spectrum inquiry 715 is sent by the CBSD to the SAS to discover what channels may be available for operation in the CBRS band to provide wireless connectivity. Based on the list of available channels provided by the SAS, the CBSD can determine the one or more channels suitable for its operation based on various measurements such as signal strength measurements on pilot signals, signal-to-noise ratios, received signal strength indicators, and the like. The SAS responds to the spectrum inquiry 715 with a spectrum inquiry response 720 that indicates one or more available channels in the shared spectrum. The available channels can include some or all of the requested channels or other channels that the SAS determines are available for providing wireless connectivity.

The CBSD transmits a grant request 725 to the SAS. Some embodiments of the grant request 725 include information identifying one of the channels indicated in the spectrum inquiry response 720. The SAS responds by transmitting a grant response 730, which indicates whether the SAS granted or denied the request. If the grant response 730 indicates that the request is granted, the grant response 730 also includes information defining a frequency of heartbeat messages that are to be transmitted between the CBSD and the SAS to indicate an active connection. The frequency of the heartbeat messages can be indicated by a time interval between successive heartbeat messages such as 20 seconds, 30 seconds, 60 seconds, and the like. The SAS that transmits the grant response 730 to the CBSD is then referred to as the primary SAS instance. Although not shown in FIG. 7, the CBSD is also associated with a geo-redundant secondary SAS instance. The CBSD is not initially registered with the geo-redundant secondary SAS instance.

The CBSD transmits a first heartbeat message 735 to the SAS, which responds with a second heartbeat response message 740. The CBSD waits for a predetermined time interval 745 after transmitting the first heartbeat message 735 to transmit a third heartbeat message 750. The SAS responds with a fourth heartbeat response message 755. The CBSD and the SAS continue to exchange heartbeat messages at the heartbeat frequency indicated in the grant response 730. Setting the heartbeat frequency at a relatively high frequency, and relatively low time interval between successive transmissions such as 20 seconds, provides an opportunity to each CBSD to exchange multiple heartbeat messages per minute.

As discussed herein, if there is no heartbeat exchange between the CBSD and the SAS for more than a timeout interval (such as 240 seconds or 300 seconds), the rules set forth in 47 CFR Part 96 require that the CBSD must cease its operation in the CBRS band. The CBSD attempts to maintain the SAS service by switching from the primary SAS instance to a secondary SAS instance. Some embodiments of the CBSD transmit a message (such as a heartbeat message) including an identifier of the CBSD to the secondary SAS instance in response to the primary SAS instance becoming unavailable. The secondary SAS instance then attempts to locate a record in a shared database using the identifier and if the secondary SAS instance locates the record the secondary SAS instance continues the SAS session based on the information in the record, as discussed in detail herein.

Figure 8:
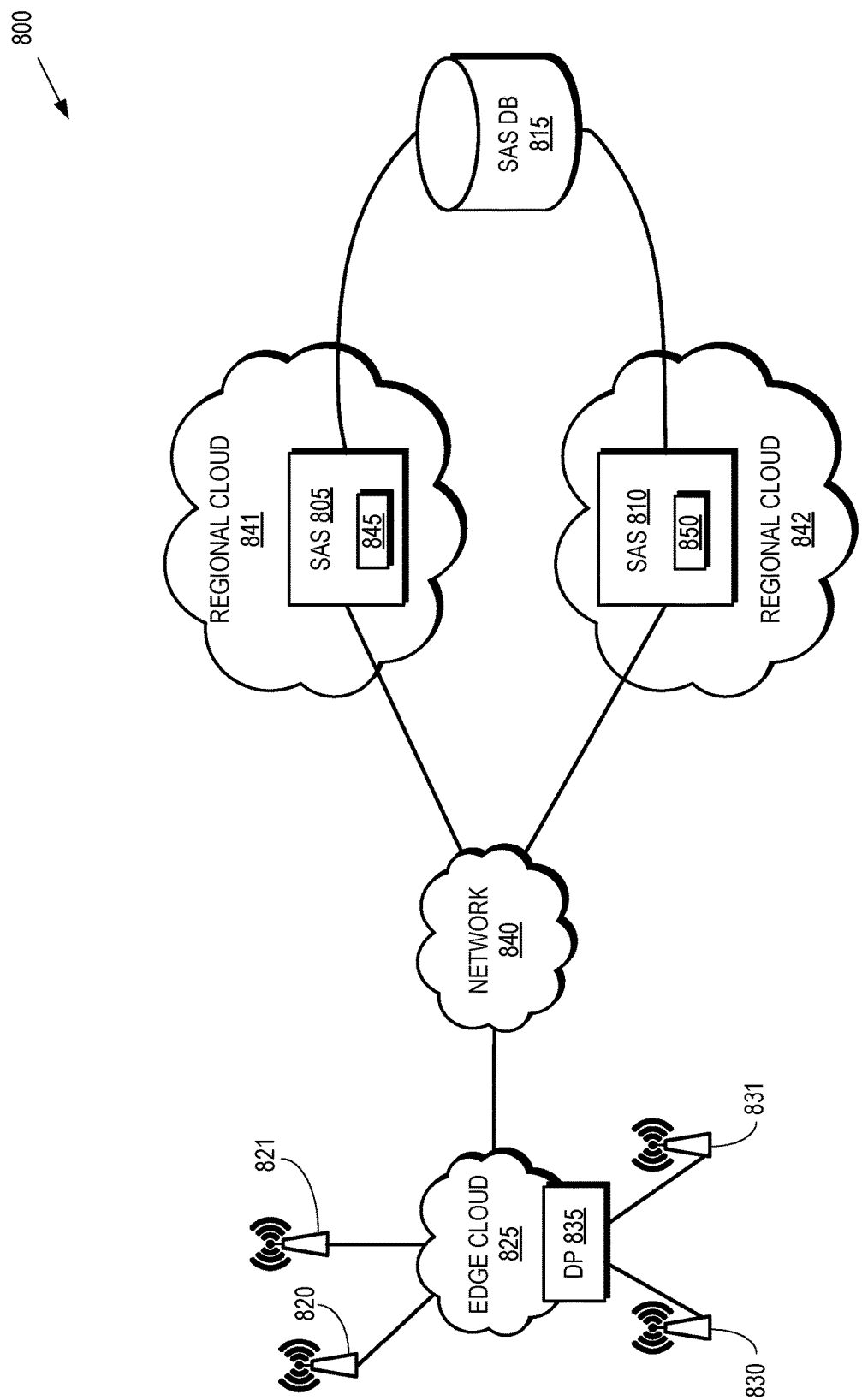
FIG. 8 is a block diagram of a communication system that implements primary and secondary SAS instances that share a database according to some embodiments.

FIG. 8 is a block diagram of a communication system 800 that implements primary and secondary SAS instances 805, 810 that share a database 815 according to some embodiments. The shared database 815 is also implemented in some embodiments of the communication system 100 shown in FIG. 1, the communication system 400 shown in FIG. 4, the communication system 500 shown in FIG. 5, and the communication system 600 shown in FIG. 6.

The communication system 800 includes base stations 820, 821 that are connected to an edge cloud 825 such as the edge cloud 125 shown in FIG. 1. The base stations 820, 821 provide wireless connectivity within corresponding geographic areas or cells. The communication system 800 also includes base stations 830, 831 that are connected to a domain proxy 835 such as the domain proxy 130 shown in FIG. 1. The edge cloud 825 is connected to a network 840 such as the Internet, which interconnects the edge cloud 825 with regional clouds 841, 842 that are located at different geographical locations to provide geo-redundancy.

The base stations 820, 821, 830, 831 register with one of the SAS instances 805, 810 as a primary SAS instance and use the other one of the SAS instances 805, 810 as a geo-redundant secondary SAS instance. In the illustrated embodiment, the base station 820 registers with the (primary) SAS instance 805 to establish an SAS service for providing wireless connectivity. The base station 820 and the primary SAS instance 805 begin exchanging heartbeat messages, e.g., according to some embodiments of the method 700 shown in FIG. 7. The primary SAS instance 805 stores state and channel information 845 for the SAS service that is provided to the base station 820. The SAS instance 810 is allocated as a secondary SAS instance for the base station 820. As discussed herein, the base station 805 begins transmitting heartbeat messages to the secondary SAS instance 810 in response to determining that the primary SAS instance 805 is unavailable. For example, the base station 805 can determine that the primary SAS instance 805 is unavailable in response to losing the heartbeat messages for a predetermined time interval.

The heartbeat messages transmitted to the secondary SAS instance 810 include an identifier of the base station 820. The secondary SAS instance 810 uses the identifier included in the heartbeat message to attempt to access a record for the base station 820, such as a record including up-to-date state and channel information for the base station 820. If the primary and secondary SAS instances 805, 810 do not share the database 815, the secondary SAS instance 810 will not be able to locate the record using the identifier. In that case, the secondary SAS instance 810 forces the base station 820 to re-register, which results in a service delay and a potential radio access network outage. The SAS instances 805, 810 are therefore configured to share the database 815 and to periodically synchronize the database 815. For example, the channel and state information 845 in the primary SAS instance 805 and channel and state information 850 in the secondary SAS instance 810 are used to synchronize the shared database 815. Once synchronized, the shared database 815 includes up-to-date channel and state information for the base stations 820, 821, 830, 831. The secondary SAS instance 810 is therefore able to access the record for the base station 820 using the identifier in the heartbeat messages. The SAS service that was previously provided to the base station 820 by the primary SAS instance 805 can therefore be refreshed and the secondary SAS instance 810 continues to provide the SAS service to the base station 820 without requiring re-registration.

Figure 9:
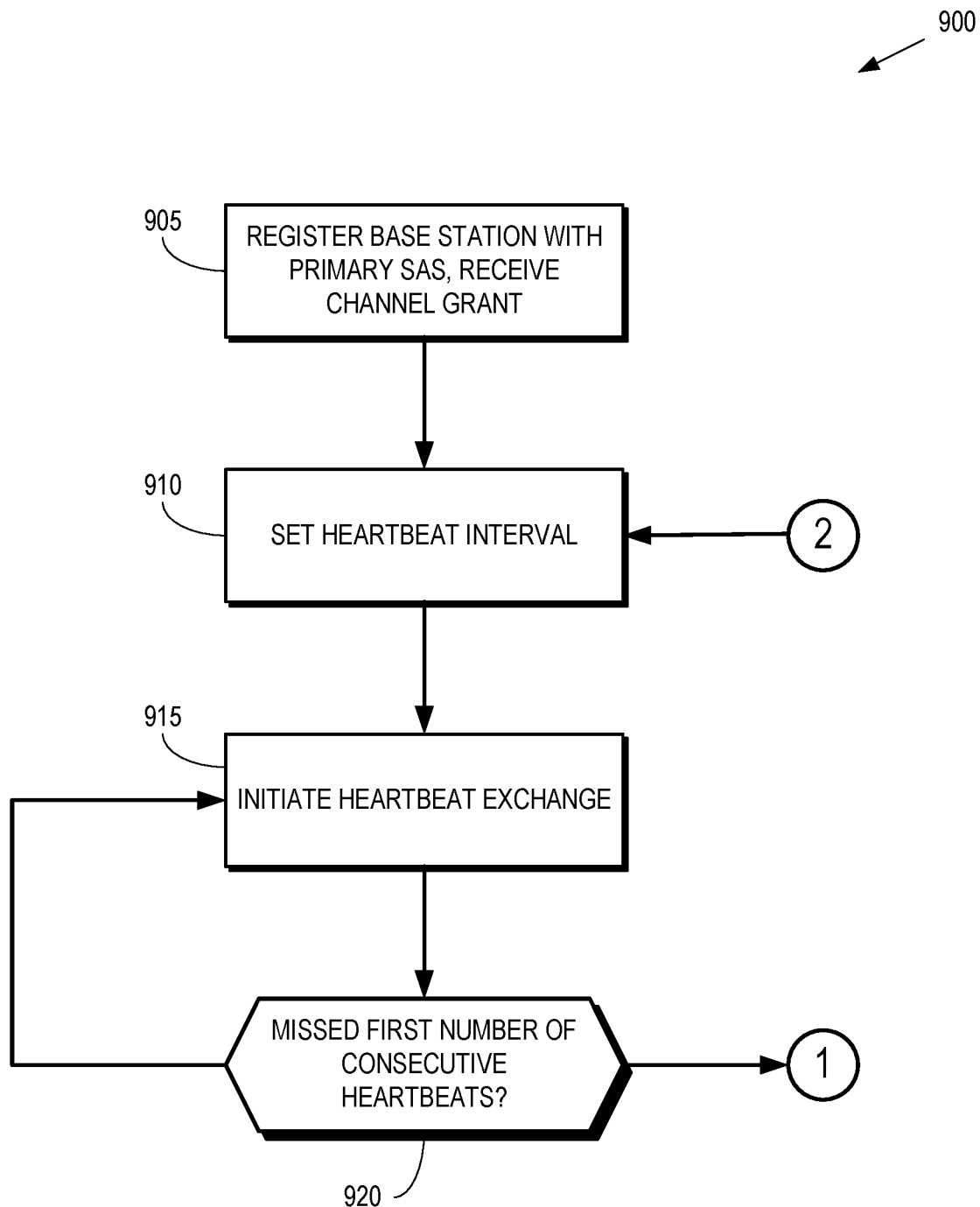
FIG. 9 is a flow diagram of a method of detecting a primary SAS instance that has become unavailable according to some embodiments.

FIG. 9 is a flow diagram of a method 900 of detecting a primary SAS instance that has become unavailable according to some embodiments. The method 900 is implemented in some embodiments of the communication system 100 shown in FIG. 1, the communication system 400 shown in FIG. 4, the communication system 500 shown in FIG. 5, the communication system 600 shown in FIG. 6, and the communication system 800 shown in FIG. 8. Some embodiments of the method 900 are implemented in base stations and some embodiments of the method 900 are implemented in a domain proxy for a set of base stations, such as the domain proxy 130 shown in FIG. 1.

At block 905, a base station registers with a primary SAS instance and receives a channel grant indicating a channel that is granted to the base station for providing wireless connectivity. Some embodiments of the base station register with the primary SAS instance according to the method 700 shown in FIG. 7.

At block 910, the primary SAS instance determines a heartbeat frequency or heartbeat interval for the exchange of heartbeat messages between the base station and the primary SAS. For example, the heartbeat interval can be set at 20 seconds, although other durations of the heartbeat interval are used in other cases. In the illustrated embodiment, a timeout interval is set at 240 seconds. The base station is therefore required to de-active and stop transmitting on the granted channel if heartbeat messages are lost for more than the timeout interval, e.g., if more than 12 heartbeat messages are lost.

At block 915, the base station and the primary SAS instance initiate exchange of heartbeat messages. The exchange of heartbeat messages is performed concurrently with the base station providing wireless connectivity on the granted channel.

At decision block 920, the base station determines whether a predetermined number of heartbeat messages have been lost without successfully receiving a heartbeat message. For example, the base station can determine whether nine consecutive heartbeat messages have been lost. If not, the method 900 flows back to block 915 and the base station continues to provide wireless connectivity on the granted channel concurrently with the base station and the primary SAS instance exchanging heartbeat messages. If the predetermined number of heartbeat messages have been lost, the method 900 flows to node 1.

Figure 10:
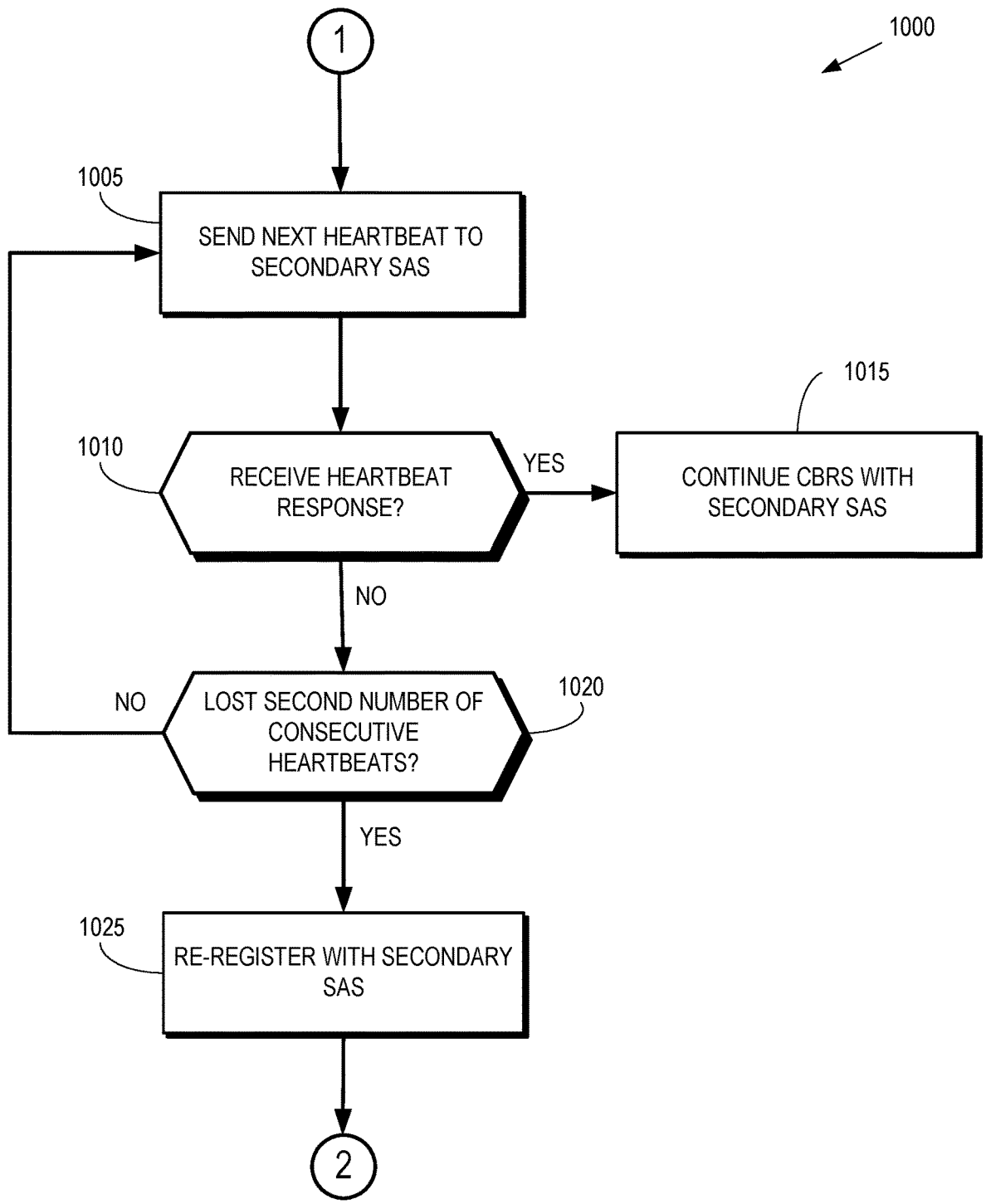
FIG. 10 is a flow diagram of a method of selectively continuing an SAS service provided to a base station using a secondary SAS instance in response to a primary SAS instance becoming unavailable according to some embodiments.

FIG. 10 is a flow diagram of a method 1000 of selectively continuing an SAS service provided to a base station using a secondary SAS instance in response to a primary SAS instance becoming unavailable according to some embodiments. The method 1000 is implemented in some embodiments of the communication system 100 shown in FIG. 1, the communication system 400 shown in FIG. 4, the communication system 500 shown in FIG. 5, the communication system 600 shown in FIG. 6, and the communication system 800 shown in FIG. 8. Some embodiments of the method 1000 are implemented in base stations and some embodiments of the method 1000 are implemented in a domain proxy for a set of base stations, such as the domain proxy 130 shown in FIG. 1.

The method 1000 begins at node 1, which flows to block 1005. In some embodiments, node 1 corresponds to node 1 shown in FIG. 9. At node 1, the base station has lost a predetermined number of heartbeat messages without successfully receiving a heartbeat message from the primary SAS instance. At block 1005, the base station transmits the next heartbeat message to the secondary SAS instance associated with the base station. The heartbeat message includes an identifier of the base station.

At decision block 1010, the base station determines whether a heartbeat response has been successfully received from the secondary SAS instance. If the base station determines that the heartbeat response was successfully received, the method 1000 flows to block 1015. If the base station determines that the heartbeat response was not successfully received, the method 1000 flows to decision block 1020.

Successful reception of the heartbeat response indicates that the secondary SAS instance located a record in a shared database associated with the base station. The secondary SAS instance is therefore able to continue (at block 1015) providing the SAS service that was previously provided by the primary SAS instance based on the record, e.g., using state and channel information that was synchronized with the primary SAS instance.

At decision block 1020, the base station determines whether a second number of consecutive heartbeat messages have been lost. In the illustrated embodiment, the base station is required to de-activate and stop transmitting on the granted channel if more than 12 heartbeat messages are lost. The base station begins transmitting the heartbeat messages to the secondary SAS instance in response to nine heartbeat messages being lost. The second number of consecutive heartbeat messages is therefore equal to the difference between these time intervals, i.e., three heartbeat messages. If the base station has not lost the second number of consecutive heartbeat messages, the method 1000 flows back to block 1005. If the base station has lost the second number of consecutive heartbeat messages, the method 1000 flows to block 1025.

At block 1025, the base station de-activate and stops transmitting on the granted channel, as required by the FCC rules. The base station then re-registers with the secondary SAS instance and receives a channel grant for operation in the CBRS band. The method 1000 then flows to node 2, which corresponds to node 2 in some embodiments of the method 900 shown in FIG. 9.

Figure 11:
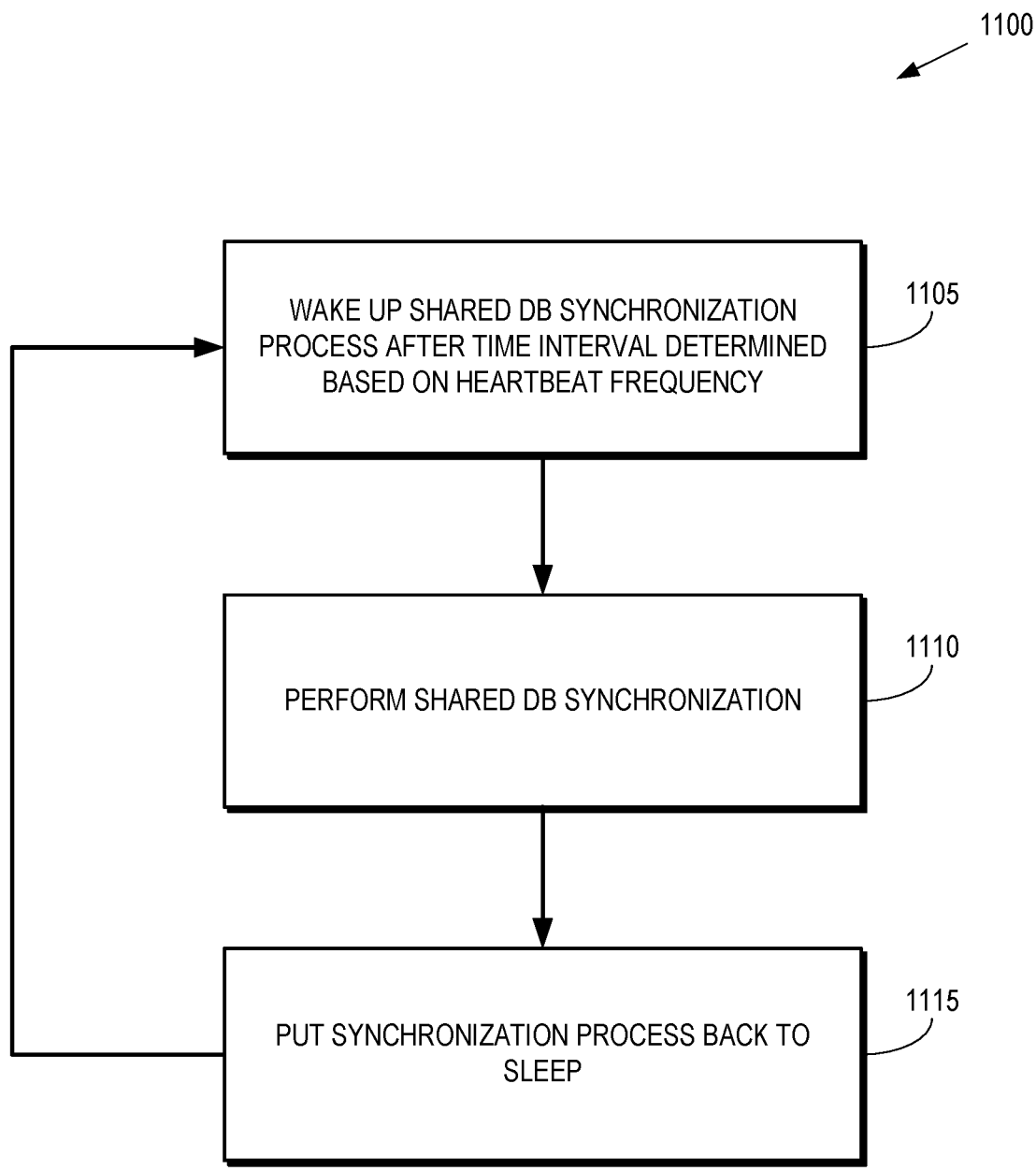
FIG. 11 is a flow diagram of a method of synchronizing a database shared by the primary SAS instance and a secondary SAS instance according to some embodiments.

FIG. 11 is a flow diagram of a method 1100 of synchronizing a database shared by the primary SAS instance and a secondary SAS instance according to some embodiments. The method 1100 is implemented in some embodiments of the communication system 100 shown in FIG. 1, the communication system 400 shown in FIG. 4, the communication system 500 shown in FIG. 5, the communication system 600 shown in FIG. 6, and the communication system 800 shown in FIG. 8.

At block 1105, the shared database synchronization process is woken up after a time interval that is determined based on a frequency of heartbeat messages exchanged by the base station, the primary SAS instance, and the secondary SAS instance. In some embodiments, the time interval for waking up the shared database is less than a time interval for exchanging the heartbeat messages. For example, if the base station and the primary SAS instance are configured to exchange heartbeat messages every 20 seconds, the time interval for waking up and synchronizing the shared database is set to a time interval that is less than 20 seconds to ensure that the shared database is up-to-date when the heartbeat messages are exchanged.

At block 1110, the primary SAS instance, the secondary SAS instance, and the shared database are synchronized. For example, records in the shared database associated with one or more base stations are updated to include state and channel information for the base stations that is stored in either the primary SAS instance or the secondary SAS instance. Once the synchronization is complete, the shared database synchronization process goes back to sleep at block 1115.

Figure 12:
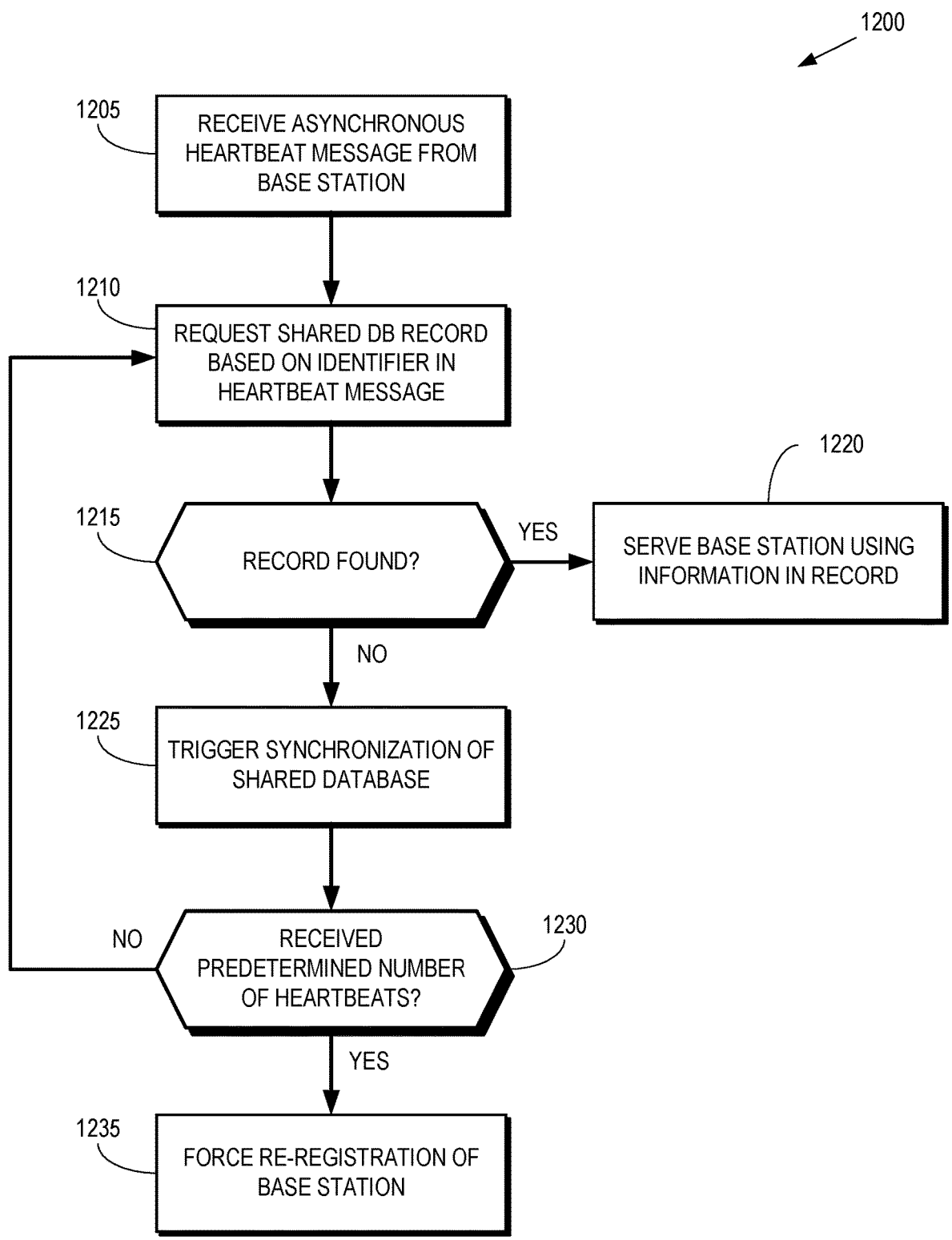
FIG. 12 is a flow diagram of a method of selectively maintaining an SAS service previously provided to a base station by primary SAS instance according to some embodiments.

FIG. 12 is a flow diagram of a method 1200 of selectively maintaining an SAS service previously provided to a base station by primary SAS instance according to some embodiments. The method 1200 is implemented in some embodiments of the communication system 100 shown in FIG. 1, the communication system 400 shown in FIG. 4, the communication system 500 shown in FIG. 5, the communication system 600 shown in FIG. 6, and the communication system 800 shown in FIG. 8. In the illustrated embodiment, the primary SAS instance granted the base station a channel for providing wireless connectivity.

At block 1205, a secondary SAS instance receives an asynchronous heartbeat message from the base station. The heartbeat message includes an identifier of the base station.

At block 1210, the secondary SAS instance requests a record from a database that is shared by the primary SAS instance and the secondary SAS instance. The request to access the record includes the identifier of the base station that was included in the heartbeat message received by the secondary SAS instance.

At decision block 1215, the secondary SAS instance determines whether the record was found in the shared database. If so, the method flows to block 1220 and the secondary SAS instance continues to serve the base station using information in the access record. In that case, the base station is not required to re-register with the secondary SAS instance. If the record was not found in the shared database, the method flows to block 1225.

At block 1225, the secondary SAS instance triggers synchronization of the shared database. Thus, if the shared database is out of date and the primary SAS instance includes state or channel information for the base station, the synchronization triggered by the secondary SAS instance brings the shared database up-to-date. A record associated with the base station may therefore be available for access by the secondary SAS instance following the synchronization.

At decision block 1230, the secondary SAS instance determines whether a predetermined number of heartbeat messages have been received from the base station. In the illustrated embodiment, the base station is required to de-activate and stop transmitting on the granted channel if more than 12 heartbeat messages are lost. The base station begins transmitting the heartbeat messages to the secondary SAS instance in response to nine heartbeat messages being lost. The predetermined number of heartbeat messages used in decision block 1230 is therefore equal to three heartbeat messages. If the predetermined number of heartbeat messages has not been received, the method 1200 flows to block 1210 and the secondary SAS instance makes another attempt to access the record from the shared database. As discussed above, the record may now be available in the shared database due to the synchronization performed at block 1225. If the predetermined number of heartbeat messages has been received, the method 1200 flows to block 1235 and the base station is forced to re-register with the secondary SAS instance.

Figure 13:
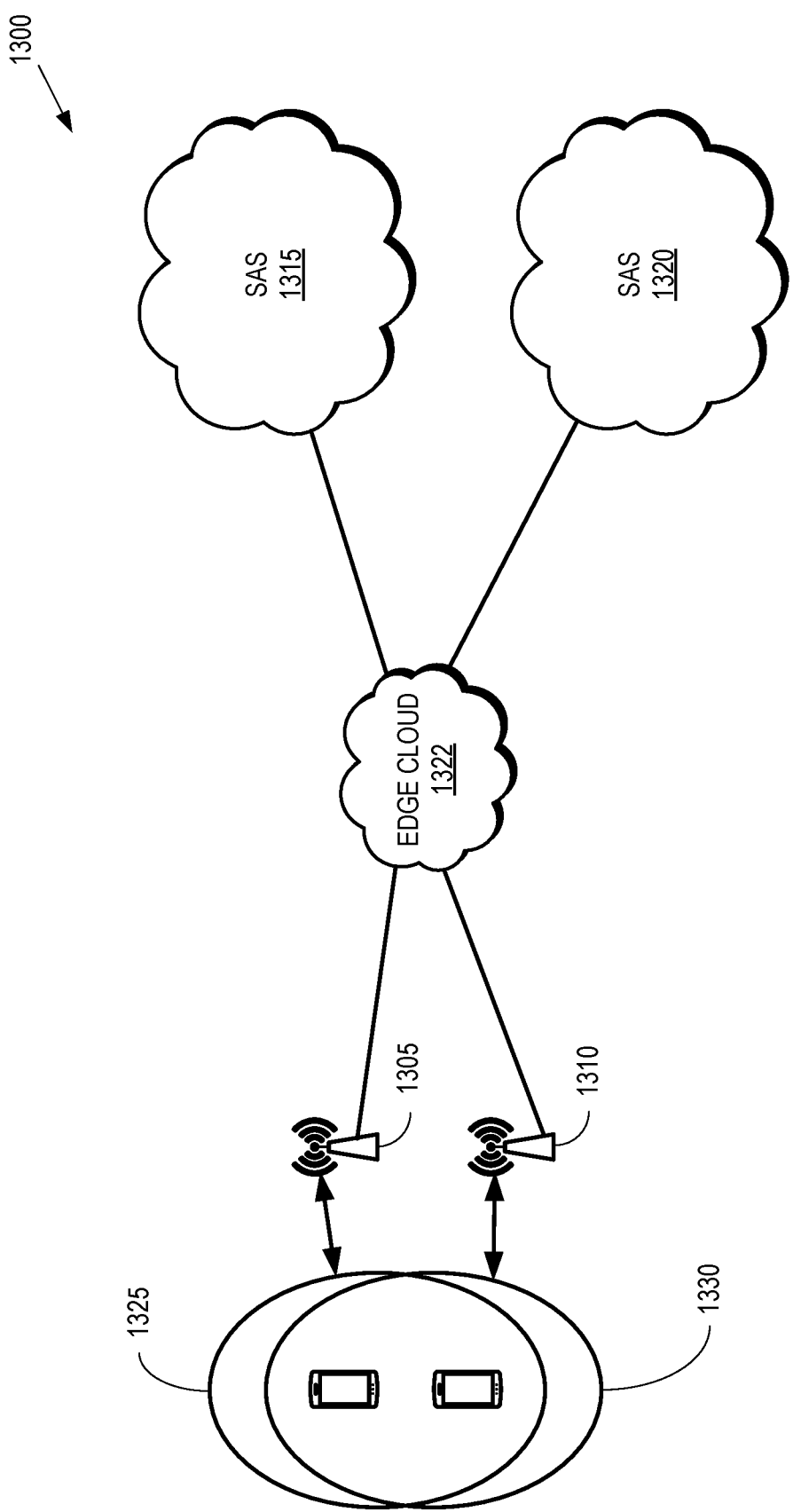
FIG. 13 is a block diagram of a communication system that includes collocated base stations according to some embodiments.

FIG. 13 is a block diagram of a communication system 1300 that includes collocated base stations 1305, 1310 according to some embodiments. The communication system 1300 includes geo-redundant SAS instances 1315, 1320 that can operate as either a primary or a secondary SAS instance for providing SAS services. An edge cloud 1322 provides connectivity between the base station 1305, 1310 and the SAS instances 1315, 1320. The base stations 1305, 1310 and the SAS instances 1315, 1320 are configured in a switched primary/secondary configuration. The base station 1305 is registered with the primary SAS instance 1315 to provide connectivity in the cell 1325. The SAS instance 1320 is the secondary SAS instance for the base station 1305. The base station 1310 is registered with the primary SAS instance 1320 to provide connectivity in the cell 1330. The SAS instance 1315 is the secondary SAS instance for the base station 1310.

As discussed herein, the base stations 1305, 1310 can switch over to a secondary SAS instance in response to a primary SAS instance going down or otherwise becoming unavailable to support SAS services. However, switching over to a secondary SAS instance can take a significant amount of time, e.g. 5-6 minutes. The collocated base station 1305, 1310 provide backup for each other to support connectivity for the user equipment 1335, 1340 in the overlapping cells 1325, 1330. For example, if the user equipment 1335 is served by the base station 1305 and the primary SAS instance 1315 becomes unavailable, the user equipment 1335 hands off to the base station 1310 while the base station 1305 switches over to its secondary SAS instance 1320. Once the base station 1305 establishes an SAS service with the secondary SAS instance 1320 (either by continuing the SAS service previously provided by the primary SAS instance 1315 or by re-registering with the secondary SAS instance 1320), the user equipment 1335 hands off from the base station 1310 to the base station 1305. Thus, the user equipment 1335 does not experience an interruption due to the unavailability of the SAS instance 1315.

Figure 14:
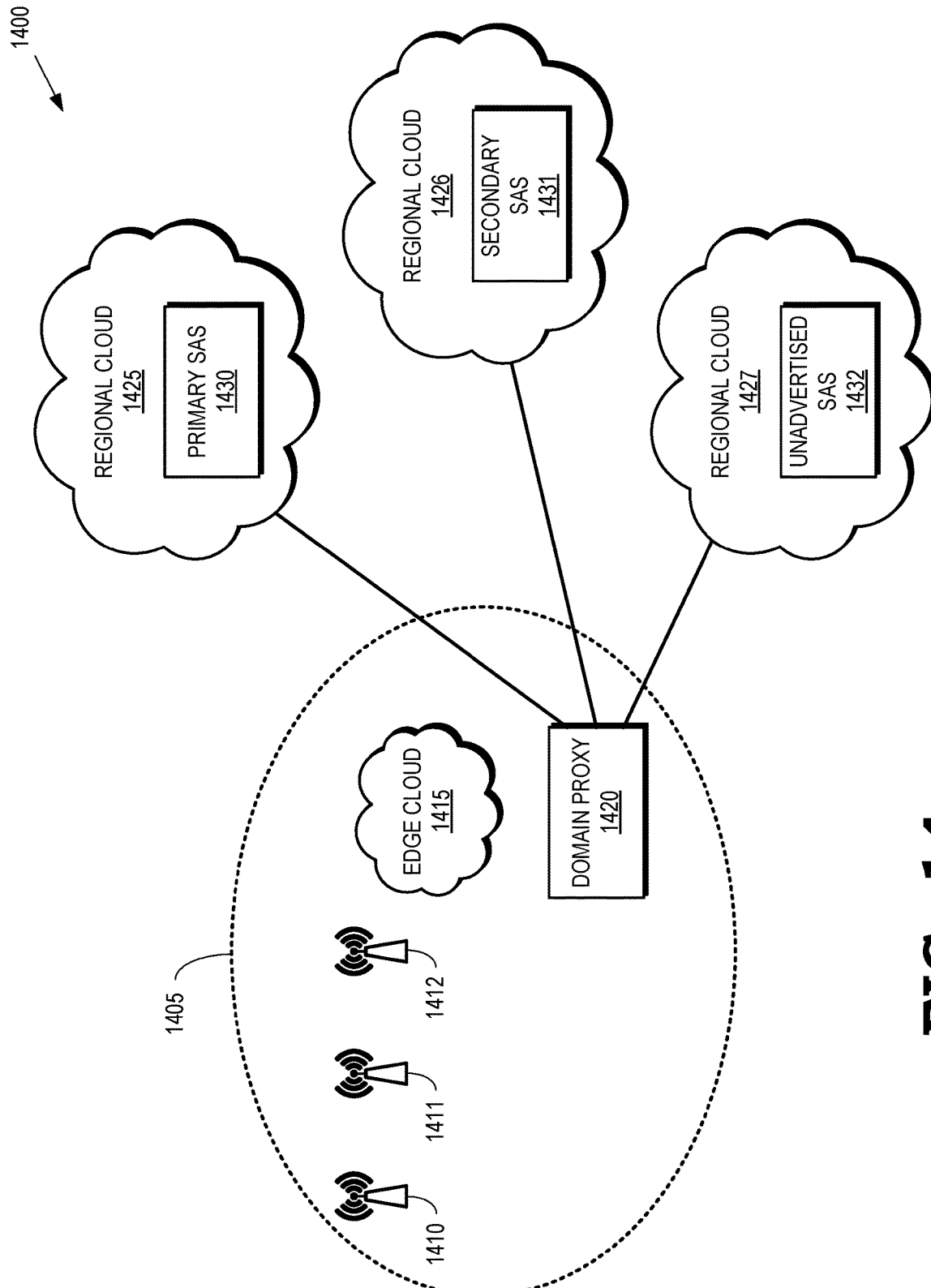
FIG. 14 is a block diagram of a communication system that provide high-availability in the event of malicious attacks such as a DDOS attack according to some embodiments.

FIG. 14 is a block diagram of a communication system 1400 that provide high-availability in the event of malicious attacks such as a DDOS attack according to some embodiments. The communication system 1400 includes a private enterprise network 1405 that includes base stations 1410, 1411, 1412 (collectively referred to herein as "the base stations 1410-1412"), an edge cloud 1415, and a domain proxy 1420. The communication system 1400 also includes geo-redundant regional clouds 1425, 1426, 1427 (collectively referred to herein as "the regional clouds 1425-1427") that support corresponding SAS instances 1430, 1431, 1432 (collectively referred to herein as "the SAS instances 1430-1432"). In the illustrated embodiment, the SAS instance 1430 is a primary SAS instance 1430 for the domain proxy 1420 (as well as the base stations 1410-1412 or other base stations associated with the private enterprise network 1405) and the SAS instance 1431 is a secondary SAS instance 1431 for the domain proxy 1420 (as well as the base stations 1410-1412 or other base stations associated with the private enterprise network 1405).

The primary SAS instance 1430 and the secondary SAS instance 1431 advertise connection information such as ports and IP addresses. The connection information is therefore visible to the base stations 1410-1412, the edge cloud 1415, and other entities, which can include malicious attackers. The primary SAS instance 1430 and the secondary SAS instance 1431 are therefore vulnerable to malicious attacks such as DDOS attacks. During a malicious attack on the SAS service provided by an SAS administrator, all the advertised geo-redundant SAS instances, including the primary SAS instance 1430 and the secondary SAS instance 1431, are under attack concurrently. Thus, if the attack is successful, all the CBRS radio access network deployments served by the geo-redundant SAS instances are forced to halt operations once the SAS instances become unavailable for more than a timeout interval such as 240 seconds.

The SAS instance 1432 is therefore configured as an unadvertised SAS instance and does not advertise connection information such as ports and IP addresses. Instead, the connection information for the unadvertised SAS instance 1432 is provisioned to the base stations 1410-1412 and the edge cloud 1415 during installation or configuration. The base stations 1410-1412 and the edge cloud 1415 therefore have the connection information to switch to the unadvertised SAS instance 1432 in the event of a malicious attack on the primary SAS instance 1430 and the secondary SAS instance 1431. The unadvertised SAS instance 1432 receives periodic information exchanged by the primary SAS instance 1430 and the secondary essays instance 1431 including information that the instances have received from other vendors that operate other SAS instances. Some embodiments of the unadvertised SAS instance 1432 are hosted in listen-only mode on the edge cloud 1415 or in another geo-redundant data centers such as the regional cloud 1427.

During a malicious attack, message exchange latencies between the base stations 1410-1412 and the SAS instances 1430, 1431 start to increase due to the impact of the malicious attack. Some embodiments of the domain proxy 1420 are configured to monitor message latency times to detect the onset of a malicious attack. In response to detecting an increase in the message latency time, the domain proxy 1420 switch its communication from the SAS instances 1430, 1431 to the unadvertised SAS instance 1432. Which is implemented in either the edge cloud 1412 for the regional cloud 1427. The domain proxy 1420 (as well as any attached base stations such as the base stations 1410-1412) are therefore able to continue communication including exchange of heartbeat messages with the unadvertised SAS instance 1432. Thus, the SAS service remains active and the base stations 1410-1412 continue to provide connectivity. The domain proxy 1420 (as well as any attached base stations such as the base stations 1410-1412) are able to switch back to the primary SAS instance 1430 or the secondary SAS instance 1431 in response to determining that the malicious attack has ended.

The unadvertised SAS instance 1432 retains a snapshot of the state and channel information of the operational base stations 1410-1412 as well as other base stations managed by all SAS vendors that are proximate the CBRS radio access network deployment. The SAS-to-SAS information exchange is performed at predetermined intervals such as hourly, daily, or weekly to synchronize the SAS instances 1430-1432 prior to any malicious attacks. The unadvertised SAS 1432 can still perform no SAS-SAS information exchange with any other vendor advertised SAS instances.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:

hardware-only circuit implementations (such as implementations and only analog and/or digital circuitry) and combinations of hardware circuits and software, such as (as applicable):

a combination of analog and/or digital hardware circuit(s) with software/firmware and any portions of a hardware processor(s) with software (including digital signal processor(s), software, and memory(ies) that work together to cause an apparatus, such as a mobile phone or server, to perform various functions) and hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a first spectrum access system (SAS) instance of a SAS service provider, a message including an identifier of a first base station that is not registered with the first SAS instance;
accessing, by the first SAS instance, a database of the SAS service provider, wherein the database is shared with a second SAS instance of the SAS service provider and periodically synchronized with the second SAS instance; and providing, from the first SAS instance, an SAS service that was previously established between the first base station and the second SAS instance in response to the database including a record generated by the second SAS instance for the first base station.

2. The method of claim 1, wherein providing the SAS service comprises providing the SAS service based on state and channel allocation information in the record of the database.

3. The method of claim 1, wherein accessing the database comprises accessing the record in the database using the identifier of the first base station.

4. The method of claim 3, further comprising:
triggering, from the first SAS instance, synchronization of the database based on state and channel allocation information at the first SAS instance and the second SAS instance in response to the first SAS instance failing to locate the record in the database using the identifier of the first base station; and
repeating an attempt to access the record in the database using the identifier of the first base station in response to triggering the synchronization.

5. The method of claim 1, wherein receiving the message including the identifier of the first base station comprises receiving the message in response to the first base station losing heartbeat messages exchanged with the second SAS instance for a first time interval that is less than a second time interval, and wherein the first base station is required to cease transmission on a channel granted by the second SAS instance in response to losing the heartbeat messages for the second time interval.

6. The method of claim 5, wherein receiving the message including the identifier of the first base station comprises receiving a heartbeat message, and wherein the first SAS instance continues to provide the SAS service to the first base station without requiring de-registration for a third time interval equal to a difference between the first and second time intervals.

7. The method of claim 1, wherein the first base station is collocated with a second base station and provides overlapping coverage with the second base station, wherein the second base station is registered with the second SAS instance for the SAS service, and wherein a handover of the user equipment from the first base station to the second base station is performed in response to the second SAS instance becoming unavailable.

8. The method of claim 1, wherein the first SAS instance does not advertise ports or Internet protocol (IP) addresses used to provide the SAS service.

9. The method of claim 8, further comprising:
providing information identifying the first SAS instance to the first base station during installation or configuration; and
receiving the message including the identifier of the first base station in response to message latencies indicating onset of a malicious attack on the second SAS instance.

10. A method comprising:
registering, at a first base station, to provide connectivity in a shared spectrum using a spectrum access system (SAS) service provided by a first SAS instance of a SAS service provider;
transmitting, from the first base station to a second SAS instance of the SAS service provider, a message including an identifier of the first base station in response to the first SAS instance becoming unavailable; and
receiving, at the first base station, the SAS service from the second SAS instance in response to the second SAS instance accessing a record in a database of the SAS service provider that is shared by the first SAS instance and the second SAS instance.

11. The method of claim 10, wherein the record includes state and channel information for the SAS service provided by the first SAS instance.

12. The method of claim 10, further comprising:
exchanging, at the first base station, heartbeat messages with the first SAS instance in response to registering for the SAS service provided by the first SAS instance.

13. The method of claim 12, further comprising:
determining that the first SAS instance has become unavailable in response to losing the heartbeat messages for a first time interval.

14. The method of claim 13, wherein transmitting the message including the identifier comprises transmitting a heartbeat message to the second SAS instance in response to losing the heartbeat messages with the first SAS instance for the first time interval, wherein the first time interval is less than a second time interval, and wherein the first base station is required to cease transmission on a channel granted by the first SAS instance in response to losing the heartbeat messages for the second time interval.

15. The method of claim 14, wherein receiving the SAS service from the second SAS instance comprises receiving the SAS service from the second SAS instance for a third time interval that is equal to a difference between the first and second time intervals without being required to de-register by the second SAS instance.

16. The method of claim 10, wherein the first base station is collocated with a second base station that is registered with the second SAS instance to provide connectivity using the SAS service, and wherein the first and second base stations provide overlapping coverage on different channels of the shared spectrum.

17. The method of claim 16, further comprising:
handing off user equipment from the first base station to the second base station in response to the first SAS instance becoming unavailable.

18. The method of claim 10, wherein the first SAS instance does not advertise ports or Internet protocol (IP) addresses used to provide the SAS service, and further comprising:
receiving, at the first base station, information identifying the first SAS instance during installation or configuration; and
transmitting the message including the identifier of the first base station to the second SAS instance in response to message latencies indicating onset of a malicious attack on the first SAS instance.

19. An apparatus comprising:
at least one processor; and
at least one memory including instructions which, when executed by the at least one processor, cause the apparatus at least to perform:
receiving, at a first spectrum access system (SAS) instance of a SAS service provider, a message including an identifier of a first base station that is not registered with the first SAS instance;
accessing, by the first SAS instance, a database of the SAS service provider, wherein the database is shared with a second SAS instance of the SAS service provider and periodically synchronized with the second SAS instance; and
providing, from the first SAS instance, an SAS service that was previously established between the first base station and the second SAS instance in response to the database including a record generated by the second SAS instance for the first base station.

20. An apparatus comprising:

at least one processor; and at least one memory including instructions which, when executed by the at least one processor, cause the apparatus at least to perform:

registering, at a first base station, to provide connectivity in a shared spectrum using a spectrum access system (SAS) service provided by a first SAS instance of a SAS service provider;

transmitting, from the first base station to a second SAS instance of the SAS service provider, a message including an identifier of the first base station in response to the first SAS instance becoming unavailable; and receiving, at the first base station, the SAS service from the second SAS instance in response to the second SAS instance accessing a record in a database of the SAS service provider that is shared by the first SAS instance and the second SAS instance.

\* \* \* \* \*

UNITED STATES PATENT AND TRADEMARK OFFICE
CERTIFICATE OF CORRECTION

PATENT NO. : 12,250,549 B2  
APPLICATION NO. : 17/264633  
DATED : March 11, 2025  
INVENTOR(S) : Mohammad Riaz Khawer and Milind M. Buddhikot Page 1 of 1

It is certified that error appears in the above-identified patent and that said Letters Patent is hereby corrected as shown below:

On the Title Page

In Item (56) the "REFERENCES CITED" section under the "OTHER PUBLICATIONS" heading, Right Column, delete "Commitee" and insert -- Committee --.

In the Specification

In Column 1, below the TITLE and above "BACKGROUND", insert:
-- CROSS-REFERENCE TO RELATED APPLICATIONS
The present application is a 371 application of PCT Patent Application Serial No. PCT/US2018/044642, entitled "HIGH AVAILABILITY ACCESS TO SHARED SPECTRUM USING GEO-REDUNDANT SPECTRUM ACCESS SYSTEMS", and filed on 31 July 2018, the entirety of which is incorporated by reference herein. --.

Signed and Sealed this  
Twenty-ninth Day of April, 2025

Coke Morgan Stewart  
*Acting Director of the United States Patent and Trademark Office*